US009327686B2

(12) United States Patent
Kato et al.

(10) Patent No.: US 9,327,686 B2
(45) Date of Patent: May 3, 2016

(54) VEHICLE WIPER DEVICE

(71) Applicant: ASMO CO., LTD., Kosai-shi, Shizuoka-ken (JP)

(72) Inventors: Atsushi Kato, Toyohashi (JP); Keigo Hikida, Toyohashi (JP); Yoshihisa Banno, Nishio (JP)

(73) Assignee: ASMO CO., LTD., Shizuoka-pref. (JP)

( * ) Notice: Subject to any disclaimer, the term of this patent is extended or adjusted under 35 U.S.C. 154(b) by 0 days.

(21) Appl. No.: 14/770,180

(22) PCT Filed: Jun. 25, 2014

(86) PCT No.: PCT/JP2014/066835
§ 371 (c)(1),
(2) Date: Aug. 25, 2015

(87) PCT Pub. No.: WO2015/005114
PCT Pub. Date: Jan. 15, 2015

(65) Prior Publication Data
US 2016/0023638 A1  Jan. 28, 2016

(30) Foreign Application Priority Data

Jul. 9, 2013  (JP) ................. 2013-143627
Jul. 9, 2013  (JP) ................. 2013-143628
Jul. 9, 2013  (JP) ................. 2013-143629
Jul. 9, 2013  (JP) ................. 2013-143630
Dec. 19, 2013 (JP) ................. 2013-262930
Apr. 7, 2014  (JP) ................. 2014-078830

(51) Int. Cl.
*B60S 1/34* (2006.01)
*B60S 1/04* (2006.01)

(52) U.S. Cl.
CPC .............. *B60S 1/347* (2013.01); *B60S 1/0491* (2013.01); *B60S 1/3436* (2013.01); *B60S 1/3459* (2013.01); *B60S 1/3465* (2013.01); *B60S 1/3468* (2013.01); *B60S 1/3495* (2013.01)

(58) Field of Classification Search
CPC ........ B60S 1/16; B60S 1/3436; B60S 1/3459; B60S 1/3461; B60S 1/3463; B60S 1/3465; B60S 1/3468; B60S 1/3481; B60S 1/347; B60S 1/3495
USPC ............ 15/250.351, 250.352, 250.31, 250.34
See application file for complete search history.

(56) References Cited

U.S. PATENT DOCUMENTS

| 2,230,596 | A | * | 2/1941 | Horton | ................. | B60S 1/34 15/250.19 |
| 3,427,676 | A | * | 2/1969 | Riester | ................. | B60S 1/34 15/250.34 |

(Continued)

FOREIGN PATENT DOCUMENTS

| JP | 59-23750 A  | 2/1984 |
| JP | 62-185163 U | 11/1987 |

(Continued)

OTHER PUBLICATIONS

International Search Report of the International Searching Authority dated Sep. 30, 2014 issued in the corresponding International application No. PCT/JP2014/066835 (and English translation).

*Primary Examiner* — Gary Graham
(74) *Attorney, Agent, or Firm* — Posz Law Group, PLC

(57) ABSTRACT

A vehicle wiper device includes a wiper arm, a drive source, a drive shaft that is pivoted by the drive source, and a wiper arm urging member. The wiper arm urging member includes a swing member, an inclination member, a rod, and a compression spring. The inclination member includes a wiper fixing portion and a drawing portion. The rod includes a basal end supported by the drawing portion. A first end of the compression spring is supported by the swing member and the second end applies an urging force to a distal end of the rod. The compression spring acts to draw the drawing portion and urge a distal end of the wiper arm toward a wiped surface.

15 Claims, 12 Drawing Sheets

(56) References Cited

U.S. PATENT DOCUMENTS

| | | |
|---|---|---|
| 6,282,743 B1 | 9/2001 | Raynaud |
| 8,104,135 B2 | 1/2012 | Matsumoto et al. |
| 2013/0269138 A1 | 10/2013 | Kato |

FOREIGN PATENT DOCUMENTS

| | | |
|---|---|---|
| JP | 2008-273239 A | 11/2008 |
| JP | 2013-193602 A | 9/2013 |
| JP | 2014-051220 A | 3/2014 |

* cited by examiner

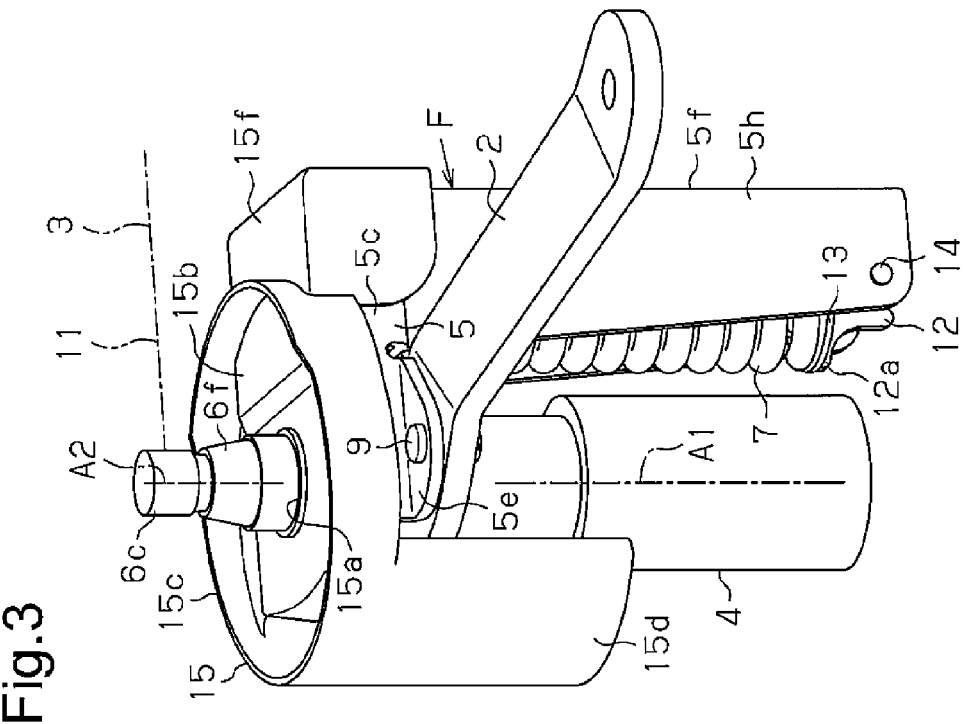

VEHICLE WIPER DEVICE

CROSS REFERENCE TO RELATED APPLICATIONS

The present disclosure is a U.S. national stage application of PCT/JP2014/066835 filed on Jun. 25, 2014 and is based on Japanese Patent Applications No. 2013-143627, filed on Jul. 9, 2013, No. 2013-143628, filed on Jul. 9, 2013, No. 2013-143629, filed on Jul. 9, 2013, No. 2013-143630, filed on Jul. 9, 2013, No. 2013-262930, filed on Dec. 19, 2013, and No. 2014-078830, filed Apr. 7, 2014, the disclosures of which are incorporated herein by reference.

TECHNICAL FIELD

The present invention relates to a vehicle wiper device.

BACKGROUND ART

A conventional vehicle wiper device includes a pivot holder that is fixed to a vehicle body and pivotally supports a pivot shaft. The pivot shaft (drive shaft) includes a basal portion projecting from a lower end of the pivot holder and fixed to a basal portion of a swing lever. The pivot shaft includes a distal portion projecting from an upper end of the pivot holder and coupled to a basal portion (inclination member) of a wiper arm. The swing lever includes a distal portion coupled to a link of a link mechanism, which is driven by a wiper motor. The swing lever swings at a predetermined angle when receiving drive force through the link. When the swing lever swings, the pivot shaft rotates and the wiper arm performs a wiping operation.

Patent document 1 discloses such a vehicle wiper device in which a basal portion (inclination member) of a wiper arm is coupled in a pivotal (inclinable) manner to a distal portion of a pivot shaft so that a distal side of the wiper arm is capable of contacting and separating from a wiped surface. An urging member is hooked directly or indirectly, by a transmission member, to the wiper arm and the swing lever.

In such a vehicle wiper device, the wiper arm may be urged toward the wiped surface by an urging force of the urging member arranged between the wiper arm and the swing lever. This eliminates the need for a portion of the wiper arm to have a U-shaped cross-section that would accommodate the urging member in the wiper arm. Thus, the degree of freedom is increased for the shape of the wiper arm.

PRIOR ART DOCUMENT

Patent Document

Patent document 1: Japanese Laid-Open Patent Publication No. 2008-273239

SUMMARY OF THE INVENTION

Problems that are to be Solved by the Invention

In the above vehicle wiper device, the urging member and the transmission member need to be arranged between the swing lever, which is located below the pivot holder, and the wiper arm, which is located above the pivot holder. However, the swing lever and the like are often coupled to the link in advance so that the link mechanism is in the form of a module. In such a structure, the urging member is coupled to the swing lever. This lowers the coupling efficiency. Additionally, in a structure in which the urging member is extended and hooked to a member located above and below the pivot holder, the urging member pivots together with the swing lever. This enlarges the area used for the pivoting.

It is an object of the present invention to provide a vehicle wiper device that allows for efficient coupling and reduction in size.

Means for Solving the Problem

To achieve the above object, one aspect of the present invention is a vehicle wiper device including a wiper arm, a drive source, a drive shaft that is pivoted back and forth by the drive source and has a pivot axis, and a wiper arm urging member. The wiper arm urging member includes a swing member, an inclination member, a rod, and a compression spring. The swing member is arranged to be pivotal integrally with the drive shaft. The inclination member is supported by the swing member and inclinable about an inclination axis. The inclination axis and the pivot axis have an intersecting or skew positional relationship. The inclination member includes a wiper fixing portion, to which the wiper arm is fixed, and a drawing portion that extends toward a distal side of the wiper arm relative to the inclination axis. The rod includes a basal end supported by the drawing portion pivotally about a parallel axis. The parallel axis is parallel to the inclination axis. The compression spring includes a first end and a second end located at a side opposite to the first end. The first end is supported by the swing member and the second end applies an urging force to a distal end of the rod so that the compression spring acts to draw the drawing portion and urge a distal end of the wiper arm toward a wiped surface.

BRIEF DESCRIPTION OF THE DRAWINGS

FIG. 3 is a perspective view of the vehicle wiper device of FIG. 2.

FIG. 4 is a perspective view of the vehicle wiper device of FIG. 2.

EMBODIMENTS OF THE INVENTION

One embodiment of a vehicle wiper device will now be described with reference to FIGS. 1 to 10.

Figure 1:
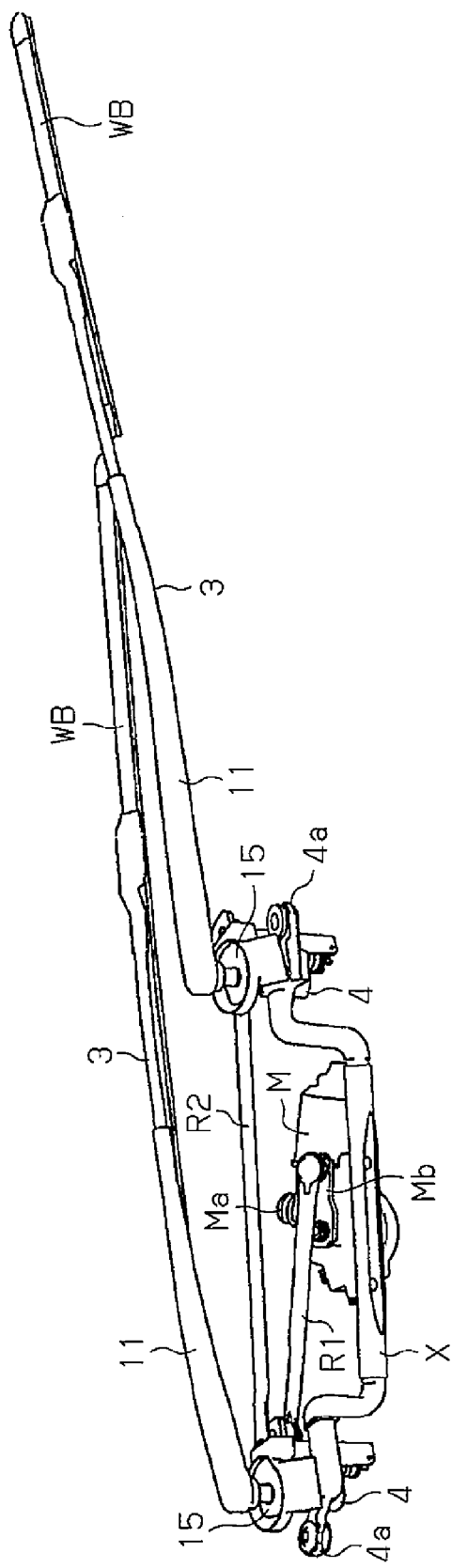
FIG. 1 is a schematic diagram of one embodiment of a vehicle wiper device according to the present invention.

As shown in FIG. 1, the vehicle wiper device includes two pivot holders 4 (pivot holder at driver seat side, or left side, as viewed in FIG. 1 and pivot holder at passenger seat side, or right side, as viewed in FIG. 1), a hollow frame X, a wiper motor M functioning as a drive source, a drive source link rod R1, and a synchronization link rod R2.

The wiper motor M, which functions as the drive source, is fixed to an intermediate portion of the hollow frame X. The pivot holders 4 are respectively fixed to two opposite ends of the hollow frame X. In the present embodiment, the pivot holders 4, the hollow frame X, the wiper motor M, and the like form a unit. The unit is supported by a vehicle body at three points when a support portion Ma included in the wiper motor M is fitted to and supported by a fitting hole (not shown) of the vehicle body and a fixing piece 4a included in each pivot holder 4 is fastened to a fastening portion (not shown) of the vehicle body.

The wiper motor M includes an output shaft, to which a crank arm Mb is fixed. The crank arm Mb rotates integrally with the output shaft. The crank arm Mb includes a distal portion, to which a basal portion of the drive source link rod R1 is pivotally coupled. The drive source link rod R1 includes a distal portion, to which a swing lever 2 (described later) of the pivot holder 4 (left side in FIG. 1) is pivotally coupled. The pivotal swing lever 2 (described later) is provided for each of the pivot holders 4. The swing levers 2 are coupled to the synchronization link rod R2 and moved (swung) in synchronization.

Figure 2:
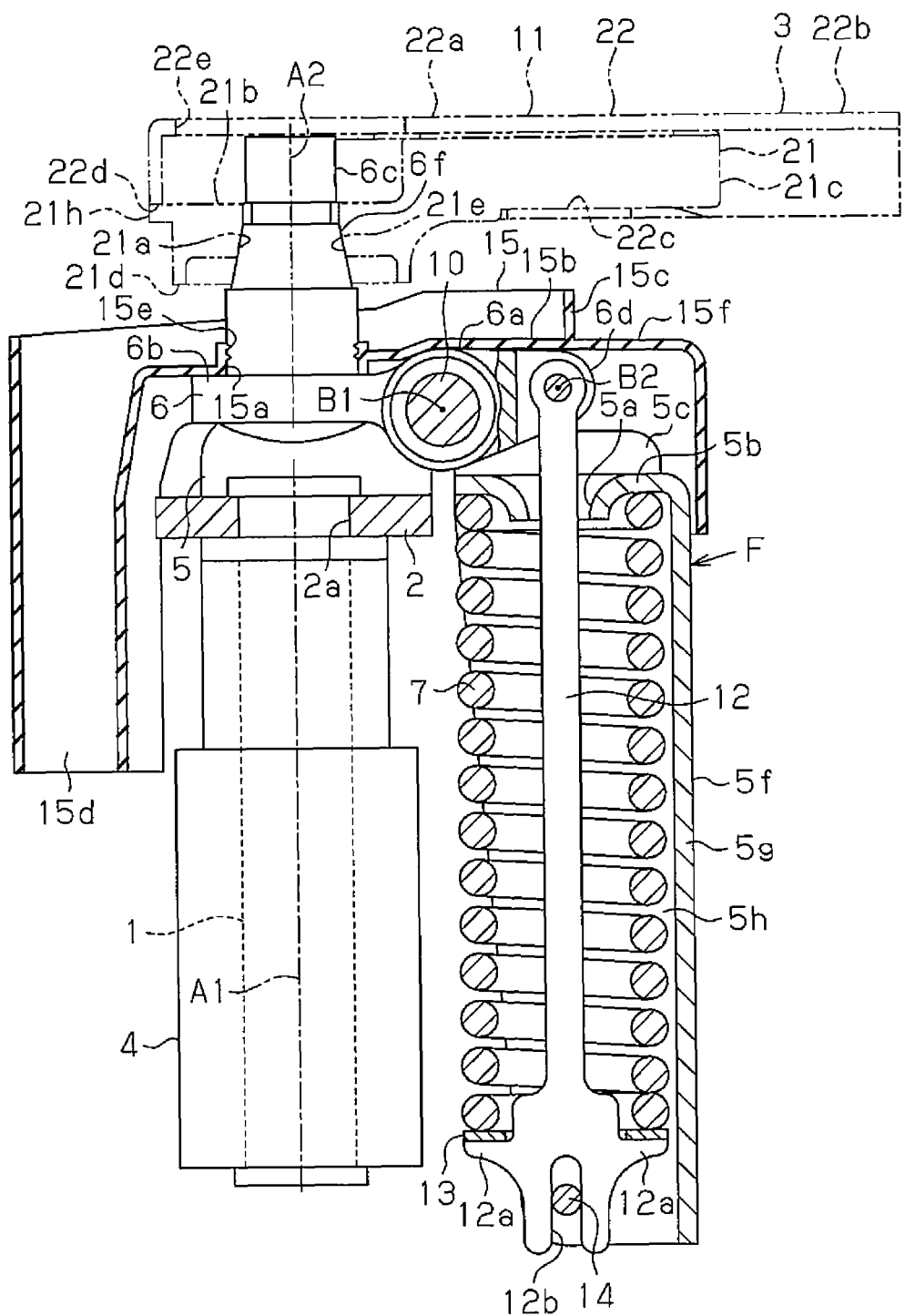
FIG. 2 is a partially cross-sectional view of the vehicle wiper device of FIG. 1.

As shown in FIGS. 2 and 3, the vehicle wiper device includes the swing levers 2, wiper arm urging members F, and wipers 3. Each swing lever 2 swings about a pivot axis A1 of a drive shaft 1 when receiving a drive force from the wiper motor M (through the drive source link rod R1 and the synchronization link rod R2). Each wiper arm urging member F is arranged to be pivotal integrally with the corresponding drive shaft 1 and the corresponding swing lever 2. The wipers 3 are fixed to the corresponding wiper arm urging members F.

The drive shaft 1 is supported by the pivot holder 4, which is tubular and fixed to the vehicle body, and rotational about the pivot axis A1. The drive shaft 1 includes a distal portion projecting upward from the pivot holder 4. The swing lever 2 includes a basal portion, which is swaged and fixed to the distal portion of the drive shaft 1. More specifically, in the present embodiment, the swing lever 2 is plate-like and includes a lever fixing hole 2a in the basal portion. The distal portion of the drive shaft 1 is extended through the lever fixing hole 2a and swaged. This restricts rotation of the swing lever 2 so that the swing lever 2 pivots integrally with the drive shaft 1.

The swing lever 2, which is a portion of the link mechanism, includes a distal portion coupled to a link, which is coupled to the wiper motor M (drive source link rod R1), and the synchronization link rod R2. When receiving drive force from the link, the swing lever 2 swings about the axis (pivot axis A1) of the drive shaft 1 at a predetermined angle.

As shown in FIG. 4, the basal portion of the swing lever 2 includes two fastening holes 2b (FIG. 4 shows only one) located proximate to the lever fixing hole 2a at opposite sides of the lever fixing hole 2a as viewed in a direction in which the lever fixing hole 2a extends. The wiper arm urging member F includes a swing member 5 fixed to the swing lever 2 where the fastening holes 2b are located.

Figure 5:
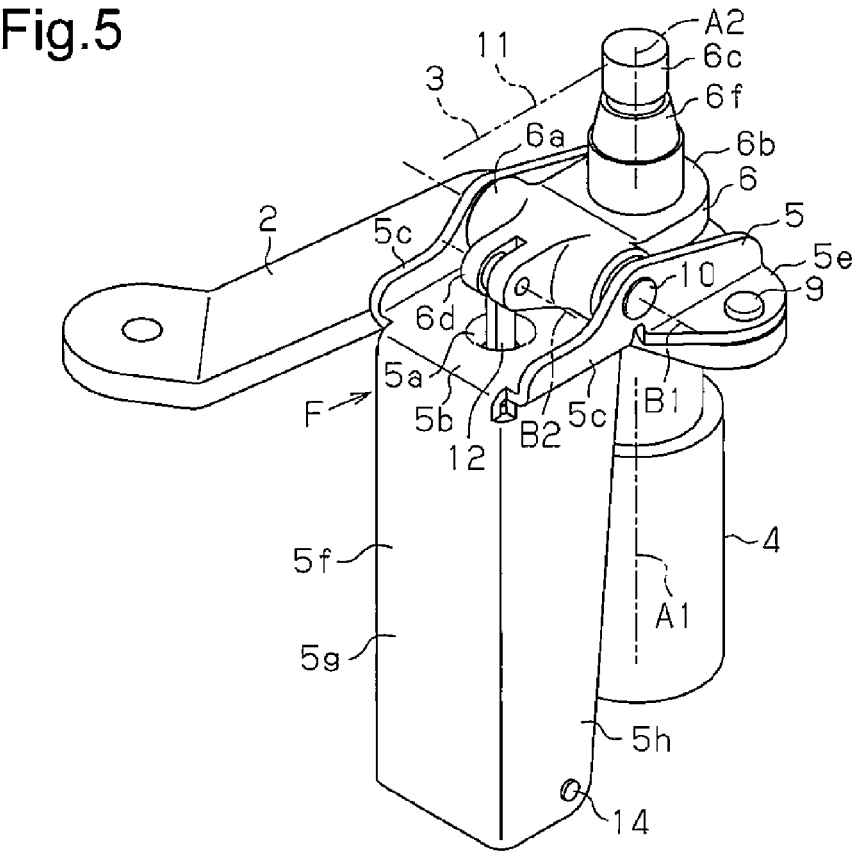
FIG. 5 is a perspective view of the vehicle wiper device of FIG. 2.

As shown in FIGS. 2, 4, and 5, the wiper arm urging member F includes the swing member 5 fixed to the swing lever 2, an inclination member 6, and a compression spring 7 (more specifically, compression coil spring) functioning as an urging member. The inclination member 6 is supported by the swing member 5 and inclinable about an inclination axis B1. The inclination axis B1 and the pivot axis A1 have a skew positional relationship. The compression spring 7 includes a first end and a second end opposite to the first end. The first end of the compression spring 7 is supported by the swing member 5 and applies an urging force to the inclination member 6.

More specifically, the swing member 5 is formed by a plate material and includes an insertion plate 5b, two side walls 5c, and two fixing portions 5e. The insertion plate 5b is tetragonal and includes an insertion hole 5a. The side walls 5c are bent upward at two opposite sides of the insertion plate 5b and extend parallel to each other along the plane of the insertion plate 5b. The fixing portions 5e are bent away from each other at distal sides of the side walls 5c. A fastening hole 5d extends through a central part of each fixing portion 5e. The insertion hole 5a is formed by a burring process so that the insertion plate 5b includes a tubular portion projecting downward. Screws 9, which are inserted through the fastening holes 5d of the fixing portions 5e and the fastening holes 2b of the swing lever 2, are fastened to nuts 8. This fastens and fixes the swing member 5 to the swing lever 2 where the fastening holes 2b are formed.

Additionally, a shaft pin 10 is fixed to a middle portion of each side wall 5c so that the shaft pin 10 extends across the two side walls 5c. The inclination member 6 includes a central portion 6a, which is supported by the shaft pin 10 and inclinable (pivotal) about the inclination axis B1.

The inclination member 6 includes an inclining portion 6b extending from one side of the central portion 6a in a direction orthogonal to the inclination axis B1. The inclining portion 6b includes a wiper fixing shaft 6c extending upward and functioning as a wiper fixing portion. The wiper fixing shaft 6c of the present embodiment is coaxial to the drive shaft 1. Here, the term "coaxial" means that the pivot axis A1 of the drive shaft 1 and an axis A2 of the wiper fixing shaft 6c are aligned depending on the angle at which the inclination member 6 is inclined. Additionally, a basal portion of a wiper arm 11, which forms a basal side of the wiper 3 and will be described later, is fixed to the wiper fixing shaft 6c. The wiper 3 includes the wiper arm 11 and a wiper blade WB (not shown) coupled to a distal side of the wiper arm 11 (refer to FIG. 1).

The inclination member 6 also includes a drawing portion 6d extending from the central portion 6a toward the side opposite to the inclining portion 6b, or a distal end of the fixed wiper arm 11. The drawing portion 6d pivotally supports a basal portion of a rod 12 about a parallel axis B2, which is parallel to the inclination axis B1. The rod 12 is arranged to extend downward through the insertion hole 5a of the insertion plate 5b. The rod 12 includes a distal end including two urged portions 12a projecting in a direction orthogonal to a direction in which the rod 12 extends.

When the compression spring 7 is compressed, the first end (upper end) is supported by a lower surface of the insertion plate 5b, and the second end (lower end) abuts against the urged portions 12a with a washer 13 located in between. This applies a downward urging force to a distal side of the rod 12. Thus, the compression spring 7 acts to draw in the drawing portion 6d so that the distal end of the wiper arm 11 is urged toward the wiped surface (downward).

The swing member 5 also includes a spring cover 5f. The spring cover 5f covers the sides of the compression spring 7 that are not opposed to the drive shaft 1 in a direction orthogonal to a direction in which the compression spring 7 is compressed. In other words, the spring cover 5f covers the sides of the compression spring 7 that are oriented toward a distal end of the wiper 3. More specifically, the spring cover 5f includes an outer cover 5g, which is bent downward from the insertion plate 5b where the drive shaft 1 is the farthest, and side covers 5h, which are bent from two opposite sides of the outer cover 5g toward the drive shaft 1 to surround the compression spring 7. That is, the spring cover 5f has a generally U-shaped cross-section that opens toward the drive shaft 1 and generally accommodates the compression spring 7.

A pin 14, which functions as a restriction portion, extends across distal portions (lower portions) of the side covers 5h and is fixed to the two side covers 5h. The distal portion of the rod 12 includes a slit 12b extending in the longitudinal direction of the rod 12 and opening in the distal end. Insertion of the pin 14 into the slit 12b allows the distal portion of the rod 12 to move in a drawing direction (downward direction) and restricts free pivoting of the rod 12 about the parallel axis B2. The position of the pin 14 conforms to the center of the insertion hole 5a as viewed in the extension direction of the insertion hole 5a. This allows the rod 12 to move along an axis generally parallel to the drive shaft 1 and arranges the compression spring 7 so that the compressing direction of the compression spring 7 is parallel to the drive shaft 1.

As shown in FIG. 2, in the present embodiment, an elastic rubber cover 15 is fixed to the inclination member 6. The elastic rubber cover 15 functions to cover an upper portion of a part (part of the central portion 6a) connecting the swing member 5 and the inclination member 6. The elastic rubber cover 15 allows the inclination member 6 to incline.

Figure 6:
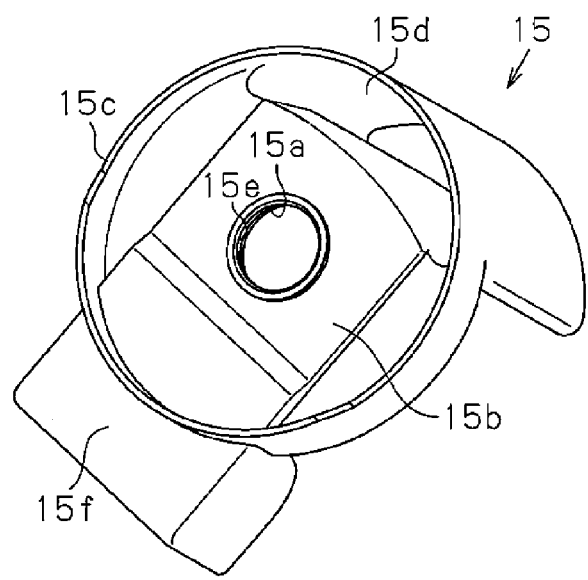
FIG. 6 is a perspective view of an elastic rubber cover of FIG. 2.

More specifically, as shown in FIGS. 2, 3, and 6, the elastic rubber cover 15 is entirely formed by an elastic member and includes a disk 15b, a wall 15c, and a drain 15d. The disk 15b has the form of a circular plate. A fixing hole 15a extends through a central portion of the disk 15b. The wall 15c is annular and extends upward from the edge of an upper surface of the disk 15b. The drain 15d extends downward through a portion of the disk 15b at an inner side of the wall 15c.

As shown in FIG. 2, a wall defining the fixing hole 15a includes a plurality of annular pressing projections 15e arranged in the extension direction. When the wiper fixing shaft 6c is inserted through the fixing hole 15a, the elastic rubber cover 15 is arranged in contact with the wiper fixing shaft 6c to hermetically seal the fixing hole 15a. In this case, the pressing projections 15e are press the wiper fixing shaft 6c. Thus, the elastic rubber cover 15, which is attached to the wiper fixing shaft 6c, restricts the entrance of a liquid that moves down along the wiper fixing shaft 6c. The disk 15b covers the upper portion of where the swing member 5 and the inclination member 6 are connected. Additionally, the drain 15d of the present embodiment generally extends to the middle of the pivot holder 4. The drain 15d is arranged at aside (left side in FIG. 2) of the drive shaft 1 opposite to a side where the wiper arm 11 extends (right side, or side where the drawing portion 6d and the compression spring 7 are arranged, as viewed in FIG. 2).

Further, the elastic rubber cover 15 of the present embodiment includes a drawing connection cover 15f extending from an outer edge of the disk 15b to cover an upper portion of where the drawing portion 6d and the rod 12 are connected. The drawing connection cover 15f of the present embodiment is formed to cover and hide the insertion plate 5b from above and also covers the insertion hole 5a.

Figure 7:
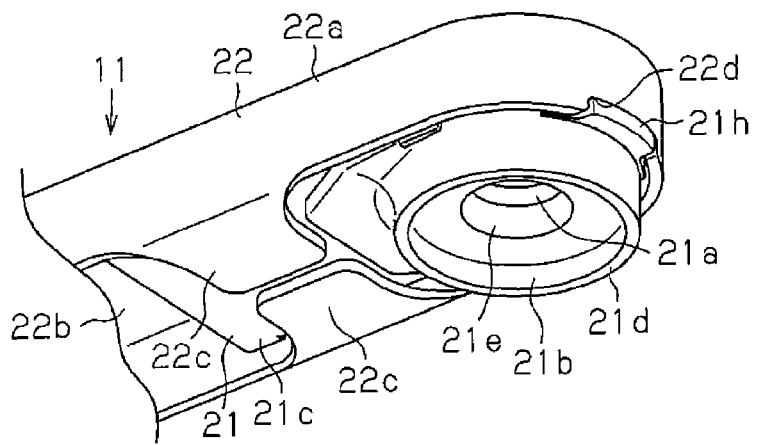
FIG. 7 is a partially perspective view of a wiper arm of FIG. 2.

As shown in FIGS. 2 and 7, the wiper arm 11 of the present embodiment includes a head member 21 and an arm member 22.

Figure 8:
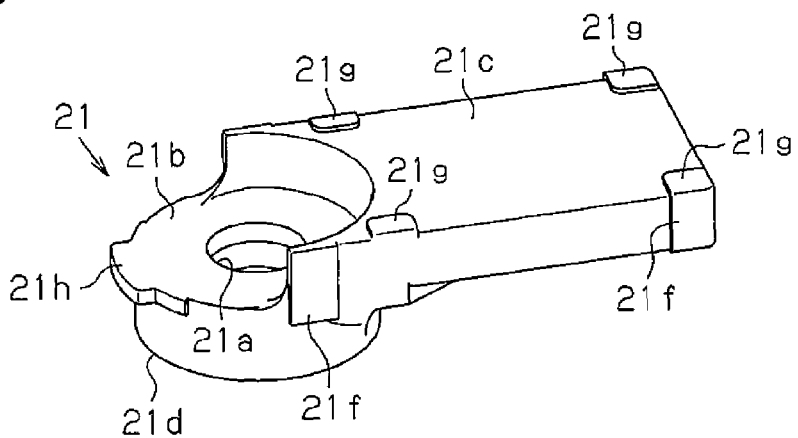
FIG. 8 is a perspective view of a head member of FIG. 7.
Figure 9:
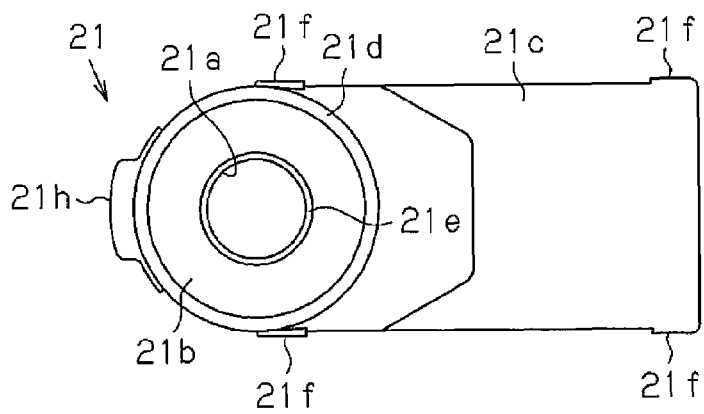
FIG. 9 is a bottom view of the head member of FIG. 8.

Referring to FIGS. 2, 8, and 9, the head member 21 is formed from an aluminum alloy. The head member 21 includes a shaft fixing portion 21b and a head extension 21c. The shaft fixing portion 21b includes a through hole 21a, through which the wiper fixing shaft 6c extends, and is fixed to the wiper fixing shaft 6c. The head extension 21c extends from the shaft fixing portion 21b in a direction orthogonal to a direction in which the pivot axis A1 extends, or in a direction orthogonal to the axis. The shaft fixing portion 21b has the form of a general disk. The through hole 21a extends through a central part of the shaft fixing portion 21a. The shaft fixing portion 21a includes a tube 21d projecting downward from the edge of a lower surface of the shaft fixing portion 21b. The through hole 21a of the shaft fixing portion 21b includes a decreasing diameter portion 21e, the diameter of which decreases at upper locations, so that the shape of the through hole 21a is in conformance with a decreasing diameter portion 6f formed in an intermediate part of the wiper fixing shaft 6c. The wiper fixing shaft 6c is inserted through the through hole 21a, and a nut (not shown) is fastened to a distal end of the wiper fixing shaft 6c projecting out of the through hole 21a. This fixes the head member 21 to the wiper fixing shaft 6c and restricts rotation of the head member 21 relative to the wiper fixing shaft 6c.

The head extension 21c has the form of a tetragonal rod extending from one side of the rim of the shaft fixing portion 21b (range of approximately 180°) in the direction orthogonal to the axis and having a thickness increased upward. The head extension 21c includes side surfaces each of which includes two side surface projections 21f arranged in a direction in which the head extension 21c extends. The head extension 21c also includes an upper surface having four corners, each of which includes an upper surface projection 21g.

The shaft fixing portion 21b includes an opposite engagement part 21h capable of engaging the arm member 22 (described later) in the extension direction of the pivot axis A1. The opposite engagement part 21h is located on the shaft fixing portion 21b at a side of the through hole 21a in a direction opposite to the direction in which the head extension 21c extends. The opposite engagement part 21h of the present embodiment is projected at a constant projection amount in the direction orthogonal to the axis from part of the rim of the shaft fixing portion 21b.

Figure 10:
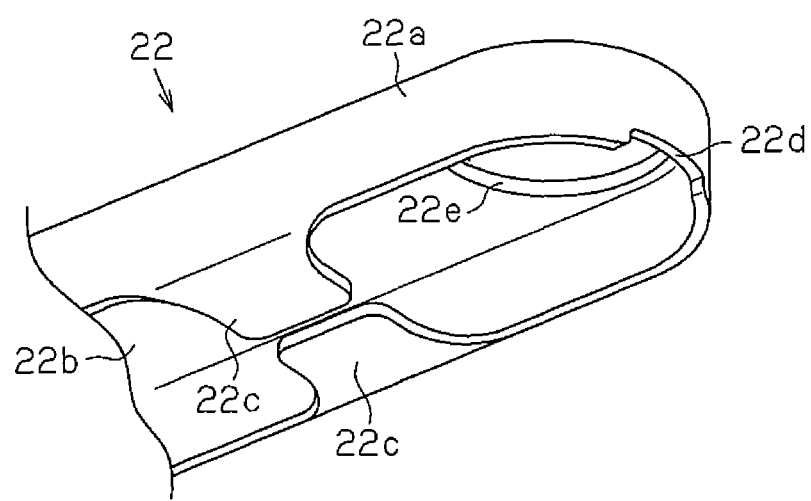
FIG. 10 is a perspective view of an arm of FIG. 7.

As shown in FIGS. 2 and 7, the arm member 22 is formed by a metal (iron) plate material. The arm member 22 includes a sheath 22a, a first arm portion 22b, and second arm portions 22c. The sheath 22a covers the upper surface and the side surfaces of the head member 21. The first arm portion 22b extends further from the sheath 22a in the direction in which the head extension 21c extends (the wiper blade WB is coupled at the end). The second arm portions 22c extend from the sheath 22a and hold the lower surface of the head extension 21c. As shown in FIGS. 7 and 10, the second arm portions 22c of the present embodiment are respectively formed by two opposite sides of the sheath 22a. When the second arm portions 22c are not bent from the sides of the sheath 22a, the head member 21 is accommodated in the sheath 22a. Then, the second arm portions 22c are bent inward to hold the lower surface of the head extension 21c. This fixes the arm member 22 to the head member 21. In this case, the side surface projections 21f and the upper surface projections 21g are pressed against an inner surface of the sheath 22a.

The arm member 22 includes a slot 22d at a location opposing the opposite engagement part 21h so that the opposite engagement part 21h engages the slot 22d. Thus, for example, when a force acting to lift the first arm portion 22b is applied, the slot 22d of the arm member 22 and the opposite engagement part 21h engage in the axial direction. Thus, the above force may be received by the head member 21 (opposite engagement part 21h) even at a side other than where the head extension 21c and the second arm portions 22c are arranged.

The sheath 22a of the arm member 22 includes an opening 22e at a location corresponding to the through hole 21a. After the wiper arm 11 is fixed to the wiper fixing shaft 6c, a cap (not shown) is fitted to the opening 22e to close the opening 22e.

The operation of the vehicle wiper device having the above structure will now be described.

When the wiper motor M is driven, the wiper arm urging member F is pivoted back and forth integrally with the drive shaft 1 and the swing lever 2 to perform a wiping operation on the wiped surface with the wipers 3 fixed to the wiper arm urging member F.

Here, the wiper arms 11 of the wiper 3 are not provided with urging member used to press the wiper blades WB against the wiped surface. However, the wiper arm urging member F acts to entirely urge the wiper 3 so that the wiper blades WB are pressed against the wiped surface. This allows a favorable wiping operation to be performed along the wiped surface.

The embodiment has the advantages described below.

(1) The inclination member 6 is supported by the swing member 5. The compression spring 7 functioning as an urging member applies an urging force to the rod 12 supported by the swing member 5 and the inclination member 6. Thus, the wiper arm urging member F functions as a member used for urging the wiper arm 11. This improves the coupling efficiency compared to a structure (prior art) in which an urging member (compression spring) needs to be coupled to the swing lever. Further, in this structure, the distal side of the wiper arm 11 is drawn toward the wiped surface by the compression spring 7, which serves as the urging member, and not a tension spring. Thus, the urging member does not need a hook. This shortens the urging member and reduces the size of the device.

(2) The swing member 5 includes the pin 14 (restriction portion). The pin 14 allows the distal portion of the rod 12 to move in the pulling direction and restricts free pivoting of the rod 12. This inhibits free pivoting of the rod 12 and generally fixes the drawing direction. Thus, for example, the positions of the rod 12 and the compression spring 7 may be stabilized. Consequently, although the rod 12 and the compression spring 7 are pivoted about the pivot axis A1 of the drive shaft 1, the area occupied by the rod 12 and the compression spring 7 is stable, and the rod 12 and the compression spring 7 do not strike other members.

(3) The swing member 5 includes the spring cover 5f. The spring cover 5f covers the side of the compression spring 7 oriented toward the distal portion of the wiper 3. Thus, the compression spring 7 may be protected. More specifically, for example, the striking of the compression spring 7 against another member may be prevented during coupling. Additionally, for example, water may be prevented from contacting the compression spring 7.

(4) The spring cover 5f is formed integrally with the swing member 5. This simplifies the arrangement without increasing the number of components.

(5) The compression spring 7 is arranged so that the compression direction is parallel to the drive shaft 1. This limits enlargement in the radial direction about the drive shaft 1. Here, the compression spring 7 pivots about the drive shaft 1. Thus, taking the pivoting of the compression spring 7 into consideration, the area occupied by the compression spring 7 may be significantly decreased.

(6) The restriction portion includes the pin 14 in the spring cover 5f at a location corresponding to the distal portion of the rod 12. Thus, the spring cover 5f is used by the restriction portion. This simplifies the structure compared to when the spring cover 5f and the restriction portion are arranged independently.

(7) The elastic rubber cover 15, which covers the upper portion of the part connecting the swing member 5 and the inclination member 6, is fixed to the inclination member 6. This limits water contacting the part connecting the swing member 5 and the inclination member 6. Additionally, the elastic rubber cover 15, which is entirely formed by an elastic member, warps. That is, the elastic rubber cover 15 may be resiliently deformed. Thus, inclination of the inclination member 6 relative to the swing member 5 is not interfered, and the elastic rubber cover 15 may be constantly located adjacent to the connection part without using a complex structure. This prevents the contact of water in a favorable manner. Additionally, since there is no interference in the inclination of the inclination member 6 relative to the swing member 5, decreases in the pressing force of the wiper 3 are restricted. Consequently, a favorable wiping operation of the wiper 3 may be maintained for a long time. Additionally, the elastic rubber cover 15, which is entirely and integrally molded from an elastic material, may be manufactured in a relatively easy manner.

(8) The swing member 5 is fixed to the swing lever 2, which extends from the drive shaft 1 in the radial direction, and the drive shaft 1 is not arranged between the swing member 5 and the swing lever 2. Although the drive shaft 1 supports the rotation of the swing member 5, the drive shaft 1 does not transmit the drive force from the swing lever 2 to the swing member 5. Thus, the swing member 5 may be easily and firmly arranged to be pivotal integrally with the drive shaft 1. Consequently, the inclination member 6 may be easily and firmly arranged to be pivotal integrally with the drive shaft 1.

(9) The swing member 5 includes the two fixing portions 5e. The fixing portions 5e are fixed to the swing lever 2 so that the drive shaft 1 is arranged between the fixing portions 5e as viewed in the axial direction of the drive shaft 1. Thus, the swing member 5 may be further firmly fixed to the swing lever 2.

(10) The wiper fixing shaft 6c is arranged coaxial to the drive shaft 1. The fixing portions 5e are arranged separately from each other so that the swing member 5 is not arranged between the drive shaft 1 and the wiper fixing shaft 6c. This increases the inclination angle of the wiper fixing shaft 6c when the distal side of the wiper arm 11 is separated from the wiped surface. More specifically, when the fixing portions 5e are connected straight to each other, the connected location would be located between the drive shaft 1 and the wiper fixing shaft 6c (inclination member 6). This decreases the range in which the wiper fixing shaft 6c is inclined. The structure of the present embodiment avoids such a situation.

(11) The elastic rubber cover 15 includes the annular wall 15c extending upward from the upper surface of the disk 15b and the tubular drain 15d extending downward at the inner side of the wall 15c. This prevents liquid from being dispersed from the upper surface by centrifugal force during pivoting. Thus, the liquid is drained from a lower side of the drain 15d. This prevents water from contacting other adjacent members and prevents liquid bouncing back from other members from contacting an upper portion of the wiper arm urging member F.

(12) When the wiper fixing shaft 6c is inserted through the fixing hole 15a, the elastic rubber cover 15 contacts the wiper fixing shaft 6c and hermetically seals the fixing hole 15a. This simplifies the structure and process for coupling the elastic rubber cover 15 that resists separation.

(13) In the structure, although the distal side of the wiper arm 11 is drawn toward the wiped surface, the compression spring 7 is used as an urging member, instead of a tension spring. Thus, the urging member does not need a hook. This shortens the urging member and reduces the size of the device. Additionally, the elastic rubber cover 15 includes the drawing connection cover 15f covering the upper portion of the part connecting the drawing portion 6d and the rod 12. This prevents water from contacting the part connecting the drawing portion 6d and the rod 12.

(14) The elastic rubber cover 15 includes the drain 15d at a side of the drive shaft 1 opposite to the distal side of the wiper arm 11 (side where the drawing portion 6d and the compression spring 7 are arranged, or right side in FIG. 2). Thus, the drain 15d is arranged so as not to be greatly separated from the drive shaft 1 in the radial direction. This limits enlargement in the radial direction about the drive shaft 1. More specifically, when the drain 15d is arranged at a side of the drive shaft where the wiper arm 11 extends, the drain 15d would need to be greatly separated from the drive shaft 1 in the radial direction to avoid the drawing portion 6d and the compression spring 7. The structure of the present embodiment avoids such a situation and allows the arrangement of the drain 15d, which limits the dispersion of drained water caused by centrifugal force. Here, the drain 15d pivots about the drive shaft 1. When taking the pivoting of the drain 15d into consideration, the area occupied by the drain 15d may be significantly decreased. Further, when the wiper is driven, the side of the drive shaft 1 opposite to the distal side of the wiper arm 11, which is fixed to the vehicle body, is located at a lower position on a plane orthogonal to the drive shaft 1. Thus, liquid may be easily guided to the drain 15d by gravity force.

(15) The wiper arm 11 includes the head member 21 and the arm member 22 formed by a plate material. The head member 21 includes the shaft fixing portion 21b including the through hole 21a and the head extension 21c. When the wiper fixing shaft 6c is inserted through the through hole 21a, the shaft fixing portion 21b is fixed to the wiper fixing shaft 6c. The head extension 21c extends from the shaft fixing portion 21b in a direction orthogonal to the direction in which the pivot axis A1 extends. Thus, the head member 21 is firmly fixed to the wiper fixing shaft 6c. The arm member 22 includes the sheath 22a covering the upper surface and the side surfaces of the head member 21, the first arm portion 22b further extending from the sheath 22a in a direction in which the head extension 21c extends, and the second arm portions 22c extending from the sheath 22a and holding the lower surface of the head extension 21c. Thus, the arm member 22 may be firmly fixed to the head member 21. Additionally, the aesthetic appeal may be improved compared to a conventional wiper arm including a pivot portion. Here, it is assumed that the wiper arm 11 does not include a pivot portion or an urging member and is entirely urged by the action of the wiper arm urging member F.

(16) The head member 21 further includes the opposite engagement part 21h, which is engagable with the arm member 22 (slot 22d) in the extension direction of the pivot axis A1. The opposite engagement part 21h is located on the head member 21 at a side of the through hole 21a in a direction opposite to the direction in which the head extension 21c extends. Thus, for example, when a force acting to lift the first arm portion 22b is applied, the force may be received by the opposite engagement part 21h of the head member 21 even at a side other than where the head extension 21c and the second arm portions 22c are arranged. This disperses a locally applied force and limits deformation compared to a head member 21 that does not include the opposite engagement part 21h.

(17) The head extension 21c has the form of a tetragonal rod. The two side surface projections 21f are formed on each side surface of the head extension 21c, which is opposed to the sheath 22a of the arm member 22, and aligned in the extension direction of the head extension 21c. Thus, the two side surface projections 21f may abut against (press-contact) the sheath 22a formed by a plate material in a desirable manner. At these locations, loosening of the head member 21 and the arm member 22 may be limited. More specifically, when the head extension 21c has flat side surfaces, relatively large planes would be in local planar-contact with the sheath 22a. This would make it difficult to avoid loosening since irregular gaps would be formed by the loosening. To avoid such a situation, in the present embodiment, the two side surface projections 21f each abut against the sheath 22a. Thus, the local planar contact occurs at different locations and limits loosening.

(18) The head extension 21c has the form of a tetragonal rod. The upper surface projections 21g are formed at the four corners of the upper surface of the head extension 21c, which is opposed to the sheath 22a of the arm member 22. Thus, the upper surface projections 21g at the four corners may favorably abut against (press-contact) the sheath 22a formed by a plate material. At these locations, loosening of the head member 21 and the arm member 22 may be limited. More specifically, when the head extension 21c has a flat upper surface, a relatively large plane would be in planar-contact with the sheath 22a. This is difficult and may form unstable gap resulting in the looseness. To avoid such a situation, in the present embodiment, the upper surface projections 21g at the four corners each abut against the sheath 22a. Thus, local planar contact occurs at different locations and limits loosening.

(19) The two second arm portions 22c are respectively formed by the opposite sides of the sheath 22a. Thus, the arm member 22 may be firmly fixed to the head member 21 compared to a structure formed by only one side.

The above embodiment may be modified as follows.

In the above embodiment, the swing member 5 includes the pin 14 (restriction portion) that allows the distal portion of the rod 12 to move in the drawing direction and restricts free pivoting of the rod 12. However, the pin 14 (restriction portion) may be omitted from the structure.

In the above embodiment, the swing member 5 includes the spring cover 5f covering the side of the compression spring 7 that is not opposed to the drive shaft 1 in the direction orthogonal to the compression direction. However, the spring cover 5f may be omitted from the structure. For example, the outer cover 5g may be omitted from the structure while the two side covers 5h are included.

In the above embodiment, the spring cover 5f is formed integrally with the swing member 5. However, the spring cover 5f and the swing member 5 may be formed separately from each other and coupled to each other.

In the above embodiment, the compression spring 7 is arranged so that the compression direction is parallel to the drive shaft 1. Instead, for example, the compression spring 7 may be inclined relative to the drive shaft 1.

In the above embodiment, the restriction portion is the pin 14 arranged in a location of the spring cover 5f that corresponds to the distal portion of the rod 12. Instead, the spring cover 5f and the restriction portion may be separately arranged.

The swing member 5 is fastened to the swing lever 2 using the screws 9, which are inserted through the fastening holes 5d and the fastening holes 2b and engaged with the nuts 8. Instead, the fixing portions 5e of the swing member 5 may be fixed to fixing portions 2e of the swing lever 2 through welding or swaging.

In the above embodiment, the swing member 5 includes the two fixing portions 5e, which have the drive shaft 1 located in between and are fixed to the swing lever 2. Instead, the structure may be changed as long as the swing member is fixed to the swing lever 2.

In the structure of the above embodiment, although the distal side of the wiper arm 11 is drawn toward the wiped surface, the compression spring 7 is used. Instead, the structure may be changed as long as the distal side of the wiper arm 11 is urged toward the wiped surface. Alternatively, a tension spring may be used in the structure.

In the above embodiment, the wiper fixing shaft 6c is coaxial with the drive shaft 1, and the fixing portions 5e are separately arranged so that the swing member 5 is not located between the drive shaft 1 and the wiper fixing shaft 6c. Instead, for example, the swing member may have a structure in which the fixing portions 5e are coupled along a straight line.

In the above embodiment, the elastic rubber cover 15 is formed by molding a rubber material. Instead, the elastic rubber cover 15 may be formed from an elastomer material or another material as long as a material has rubber elasticity (properties of elastically warping when an external force temporarily deforms the shape and restoring the shape when released from the external force).

In the above embodiment, the elastic rubber cover 15 includes the annular wall 15c extending upward from the upper surface of the disk 15b and the tubular drain 15d extending downward at the inner side of the wall 15c. Instead, the elastic rubber cover does not have to include the wall 15c and the drain 15d as long as at least the upper portion of a part connecting the swing member 5 and the inclination member 6 is covered.

In the above embodiment, when the wiper fixing shaft 6c is inserted through the fixing hole 15a, the elastic rubber cover 15 is fixed around the wiper fixing shaft 6c and hermetically seals the fixing hole 15a. Instead, the elastic rubber cover 15 may be fixed to at least one of the inclination member 6 and the swing member 5 using a different structure or a different process.

In the structure of the above embodiment, although the distal side of the wiper arm 11 is drawn toward the wiped surface, the compression spring 7 is used. Instead, the structure may be changed as long as the distal side of the wiper arm 11 is urged toward the wiped surface. Alternatively, a tension spring may be used in the structure. Additionally, the elastic rubber cover 15 includes the drawing connection cover 15f covering the upper portion of the part connecting the drawing portion 6d and the rod 12. Instead, the drawing connection cover 15f may be omitted from the structure.

In the above embodiment, the drain 15d and the location where the wiper arm 11 extends (location where the drawing portion 6d and the compression spring 7 are arranged, or right side in FIG. 2) are located at opposite sides of the drive shaft 1. Instead, the drain 15d may be located at a different position.

The above embodiment includes the elastic rubber cover 15, which is entirely formed from an elastic material. Instead, the elastic rubber cover 15 may be changed to another cover that closely contacts at least one of the inclination member 6 and the swing member 5, covers at least the upper portion of the connection part (slide part) of the swing member 5 and the inclination member 6, and allows the inclination member 6 to incline.

For example, the cover may include a resin cover main body and an elastic cover. The cover main body is fixed to a pivotal member (swing lever 2 or swing member 5), which is capable of pivoting integrally with a drive shaft or a stationary member (pivot holder 4 or vehicle louver), which is incapable of pivoting integrally with the drive shaft. The elastic cover is fixed to the cover main body. The wiper fixing shaft 6c extends through the elastic cover. The elastic cover allows the inclination member 6 to incline while closely contacting the periphery of the wiper fixing shaft 6c.

Figure 11:
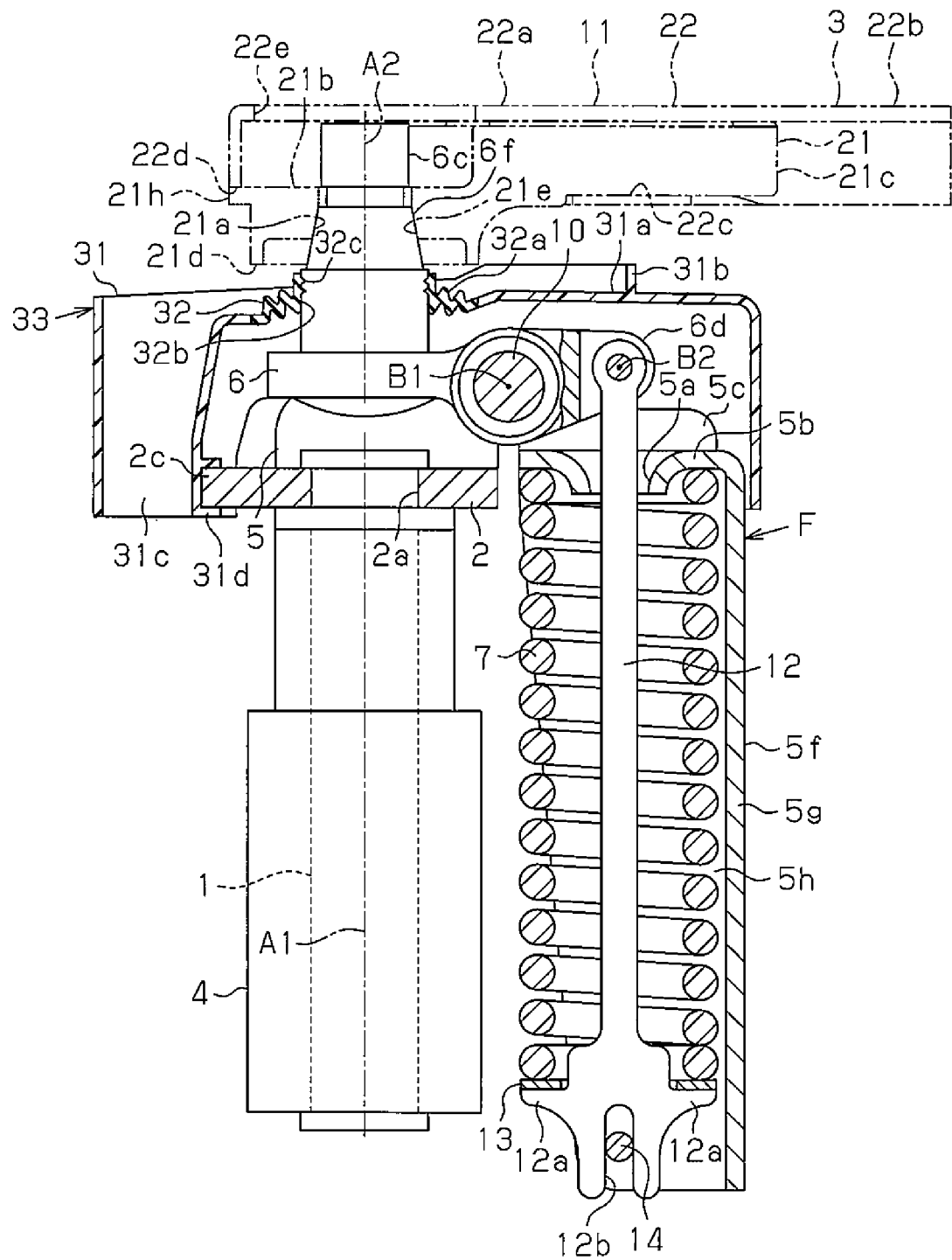
FIG. 11 is a partially cross-sectional view of a modified example of a vehicle wiper device.

More specifically, for example, as shown in FIG. 11, the elastic rubber cover 15 of the above embodiment may be changed to a cover 33 including a resin cover main body 31 and an elastic cover 32. The cover main body 31 is fixed to the swing lever 2, which functions as a pivotal member capable of pivoting integrally with the drive shaft 1. The elastic cover 32 is fixed to the cover main body 31. The wiper fixing shaft 6c extends through the elastic cover 32. The elastic cover 32 allows the inclination member 6 to incline while closely contacting the periphery of the wiper fixing shaft 6c. More specifically, in the same manner as the elastic rubber cover 15 of the embodiment, the cover main body 31 of the cover 33 of the example (refer to FIG. 11) includes a disk 31a having the form of a circular plate, an annular wall 31b extending upward from an upper circumference of the disk 31a (i.e., upper surface of the cover 33), and a tubular drain 31c extending downward from a portion of the disk 31a located at an inner side of the wall 31b. The drain 31c includes a fitting portion 31d, which is fitted to a lever fixing portion 2c included in the swing lever 2. When the fitting portion 31d is fitted to the lever fixing portion 2c, the cover 33 is fixed to the swing lever 2. In the central portion of the disk 31a of the cover main body 31, the elastic cover 32 is integrally formed by two-color molding (two-color molding of the resin material of the cover main body 31 and the elastic material of the elastic cover 32). The elastic cover 32 includes a bellows 32a, which has the form of a bellows and extends toward a central portion of the cover main body 31, and a fixing hole 32b in the central portion. The wall defining the fixing hole 32b includes a plurality of annular pressing projections 32c arranged in the extension direction. When the wiper fixing shaft 6c is inserted through the fixing hole 32b, the elastic cover 32 closely contacts the wiper fixing shaft 6c and hermetically seals the fixing hole 32b. In this case, the pressing projections 32c are pressed against the wiper fixing shaft 6c. Thus, the elastic cover 32 is attached to the wiper fixing shaft 6c and limits the entrance of liquid moving down along the wiper fixing shaft 6c. In the example, taking into consideration the compatibility of the two-color molding, the cover main body 31 is formed from polypropylene (PP), and the elastic cover 32 is formed from a thermoplastic elastomer (TPO).

Figure 12:
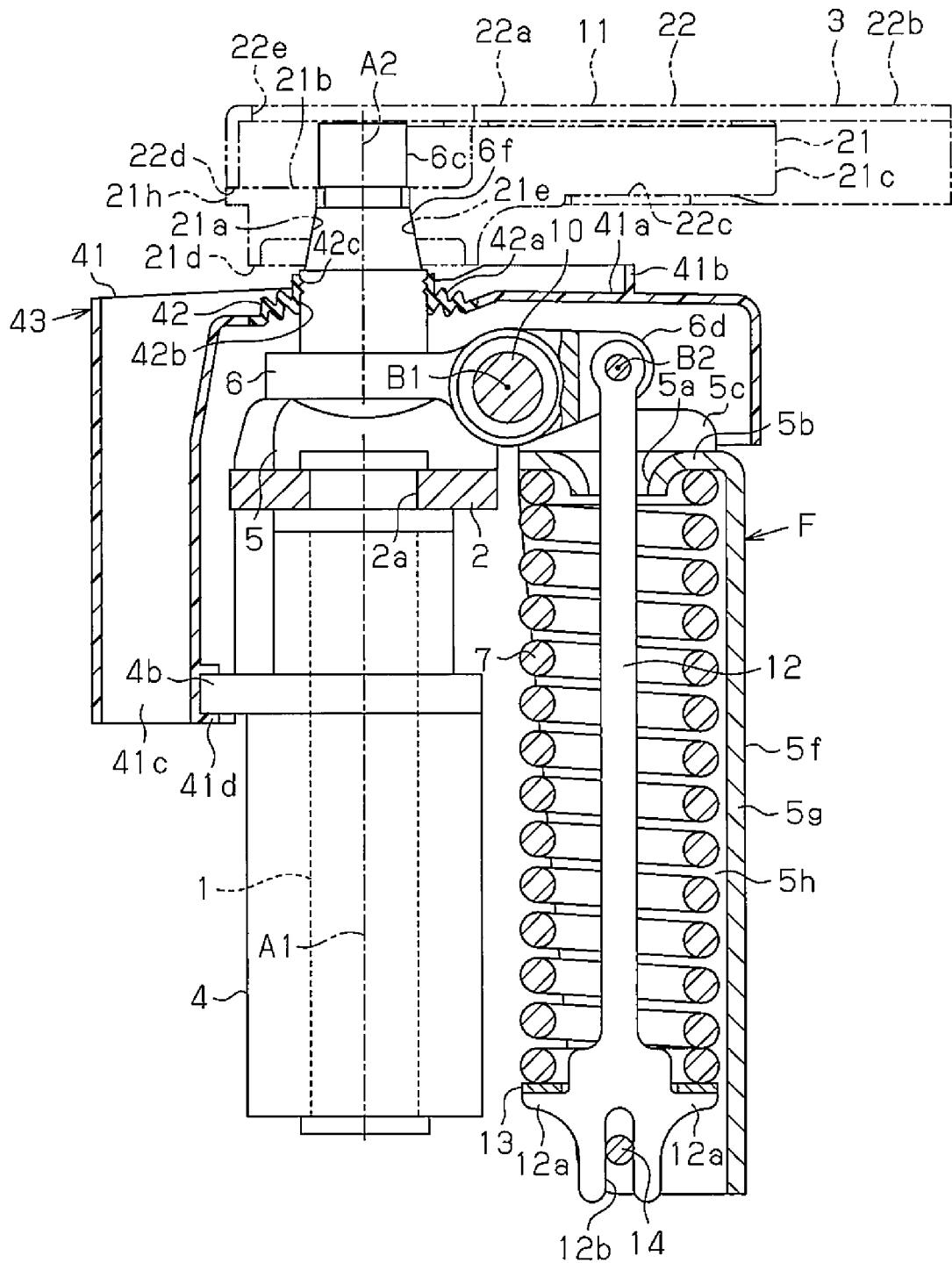
FIG. 12 is a partially cross-sectional view of a modified example of a vehicle wiper device.

Alternatively, for example, as shown in FIG. 12, the elastic rubber cover 15 of the embodiment may be changed to a cover 43 including a resin cover main body 41 and an elastic cover 42. The cover main body 41 is fixed to the pivot holder 4, which functions as a stationary member incapable of pivoting integrally with the drive shaft 1. The elastic cover 42 is fixed to the cover main body 41. The wiper fixing shaft 6c is inserted through the elastic cover 42. The elastic cover 42 allows the inclination member 6 to incline while closely contacting the periphery of the wiper fixing shaft 6c. More specifically, in the same manner as the elastic rubber cover 15 of the above embodiment, the cover main body 41 of the cover 43 of the example (refer to FIG. 12) includes a disk 41a having the form of a circular plate, an annular wall 41b extending upward from an upper circumference of the disk 41a (i.e., upper surface of the cover 43), and a tubular drain 41c extending downward from a portion of the disk 41a located at an inner side of the wall 41b. The drain 41c includes a fitting portion 41d, which is fitted to a holder fixing portion 4b included in the pivot holder 4. When the fitting portion 41d is fitted to the holder fixing portion 4b, the cover 43 is fixed to the pivot holder 4. In the central portion of the disk 41a of the cover main body 41, the elastic cover 42 is integrally formed by two-color molding. The elastic cover 42 includes a bellows 42a, which has the form of a bellows and extends toward a central portion of the cover main body 41, and a fixing hole 42b in the central portion. The wall defining the fixing hole 42b includes a plurality of annular pressing projections 42c arranged in the extension direction. When the wiper fixing shaft 6c extends through the fixing hole 42b, the elastic cover 42 closely contacts the wiper fixing shaft 6c and is attached in a liquid-tight manner. In this case, the pressing projections 42c are pressed against the wiper fixing shaft 6c. Thus, the elastic cover 42 is attached to the wiper fixing shaft 6c and limits the entrance of liquid moving down along the wiper fixing shaft 6c. In the example, taking into consideration the compatibility of the two-color molding, the cover main body 31 is formed from polypropylene (PP), and the elastic cover 32 is formed from a thermoplastic elastomer (TPO).

Figure 13:
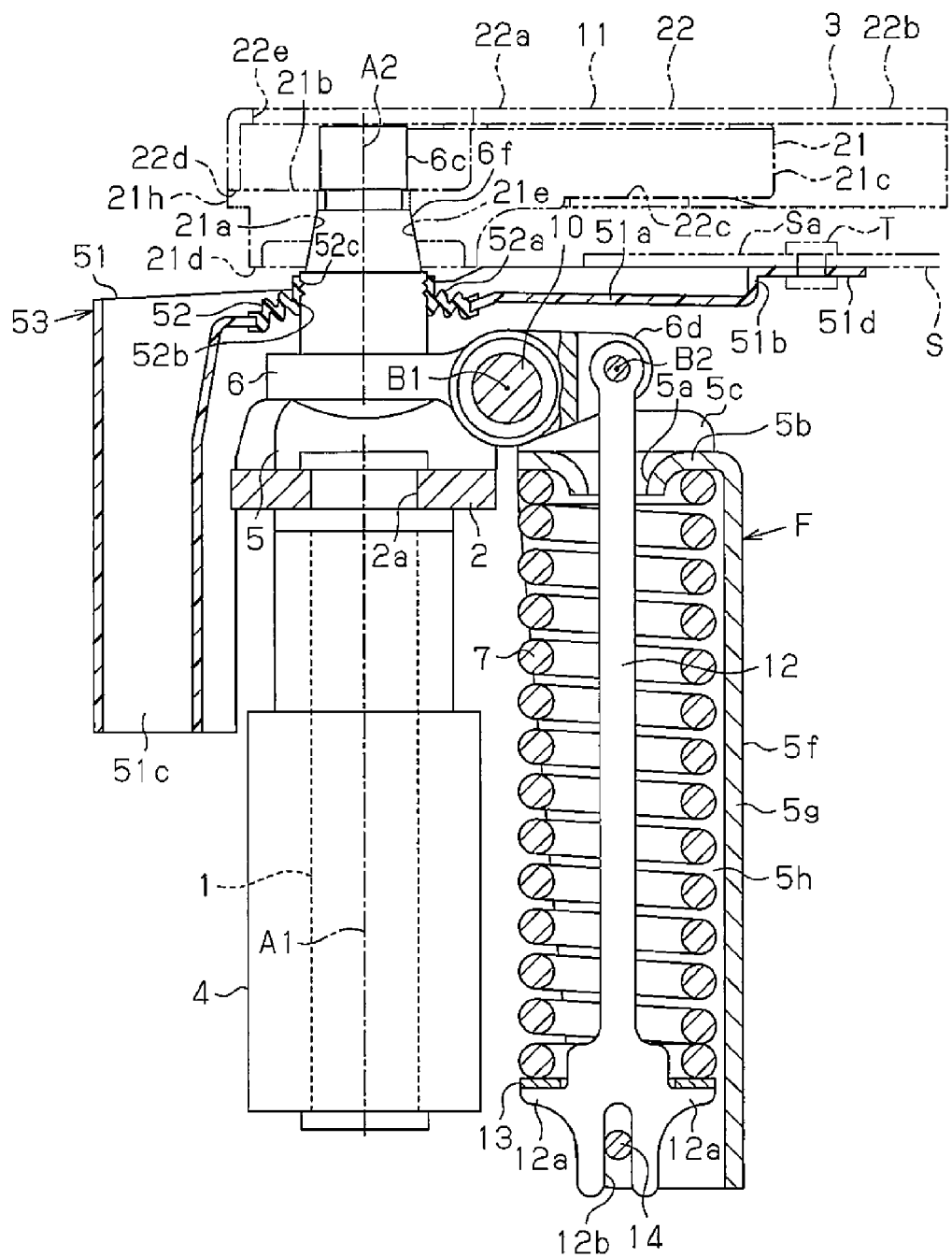
FIG. 13 is a partially cross-sectional view of a modified example of a vehicle wiper device.

Alternatively, for example, as shown in FIG. 13, the elastic rubber cover 15 of the above embodiment may be changed to a cover 53 including a resin cover main body 51 and an elastic cover 52. The cover main body 51 is fixed to a vehicle louver S, which functions as a stationary member incapable of pivoting integrally with the drive shaft 1. The elastic cover 52 is fixed to the cover main body 51. The wiper fixing shaft 6c extends through the elastic cover 52. The elastic cover 52 allows the inclination member 6 to incline while closely contacting the periphery of the wiper fixing shaft 6c. More specifically, in the same manner as the elastic rubber cover 15 of the embodiment, the cover main body 51 of the cover 53 of the example (refer to FIG. 13) includes a disk 51a having the form of a circular plate, an annular wall 51b extending upward from an upper circumference of the disk 51a (i.e., upper surface of the cover 53), and a tubular drain 51c extending downward from a portion of the disk 51a located at an inner side of the wall 51b. The wall 51b includes a fastening portion 51d, which is fastened to a louver fixing portion Sa included in the vehicle louver S. When the fastening portion 51d is fastened to the lover fixing portion Sa with a fastening member T, the cover 53 is fixed to the vehicle louver S. Additionally, the elastic cover 52 is fitted and fixed to the central portion of the disk 51a of the cover main body 51. The elastic cover 52 includes a bellows 52a, which has the form of a bellows and extends toward a central portion of the cover main body 51, and a fixing hole 52b in the central portion. The wall defining the fixing hole 52b includes a plurality of annular pressing projections 52c arranged in the extension direction. When the wiper fixing shaft 6c extends through the fixing hole 52b, the elastic cover 52 closely contacts the wiper fixing shaft 6c and hermetically seals the fixing hole 52b. In this case, the pressing projections 42c are pressed against the wiper fixing shaft 6c. Thus, the elastic cover 52 is attached to the wiper fixing shaft 6c and limits entrance of liquid moving down along the wiper fixing shaft 6c. In the example, there is no need to take into consideration the compatibility of the two-color molding. Thus, for example, the elastic cover 52 may be formed from a natural rubber.

For example, when the elastic rubber cover is entirely formed from an elastic member to allow the inclination member to incline, the rigidity is entirely decreased. Thus, the fixing strength is also decreased in a fixing location, and there may be the need to increase the thickness (increase the weight) so that the rigidity is improved. In this regard, in structures such as those shown in FIGS. 11 to 13, while the cover main bodies 31, 41, 51 have the rigidity, the elastic covers 32, 42, 52 allow the inclining of the inclination member 6. More specifically, the resin cover main bodies 31, 41, 51 are relatively rigid and have stable shapes. This improves the fixing strength to the swing member 5 or the stationary member (pivot holder 4 or vehicle louver S). Additionally, a predetermined coupling position may be maintained. This prevents water from contacting the connection part (slide part) of the swing member 5 and the inclination member 6. Further, the elastic covers 32, 42, 52 are formed from an elastic material and respectively fixed to the cover main bodies 31, 41, 51, and the wiper fixing shaft 6c extends through each of the elastic covers 32, 42, 52. Thus, each of the elastic covers 32, 42, 52 allows the inclination member 6 to incline without any interference while closely contacting the periphery of the wiper fixing shaft 6c.

In the above embodiment, the shaft fixing portion 21b includes the tube 21d extending downward from the lower circumference of the shaft fixing portion 21b. Instead, the shaft fixing portion 21b may be changed to a shaft fixing portion that does not include the tube 21d.

Figure 14:
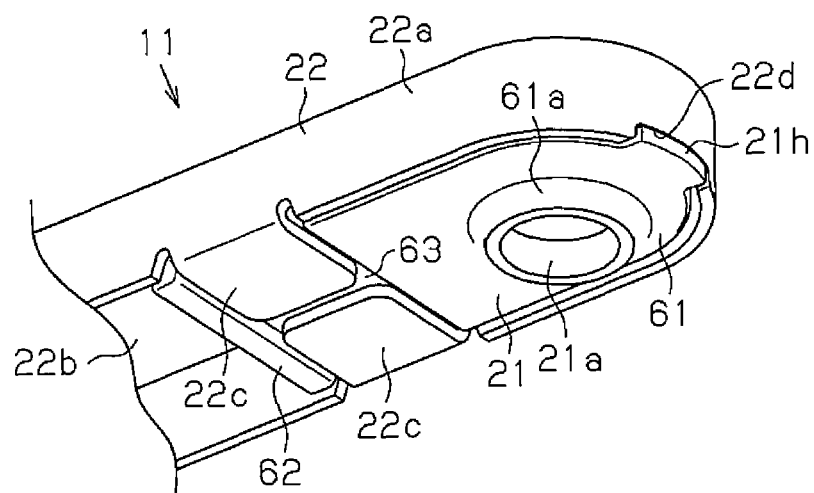
FIG. 14 is a perspective view of a modified example of a wiper arm.
Figure 15:
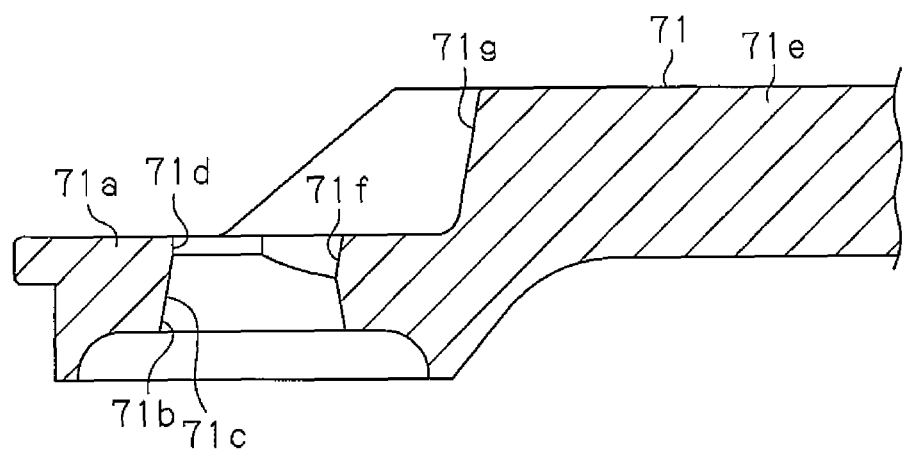
FIG. 15 is a cross-sectional view of a modified example of a head member.
Figure 16:
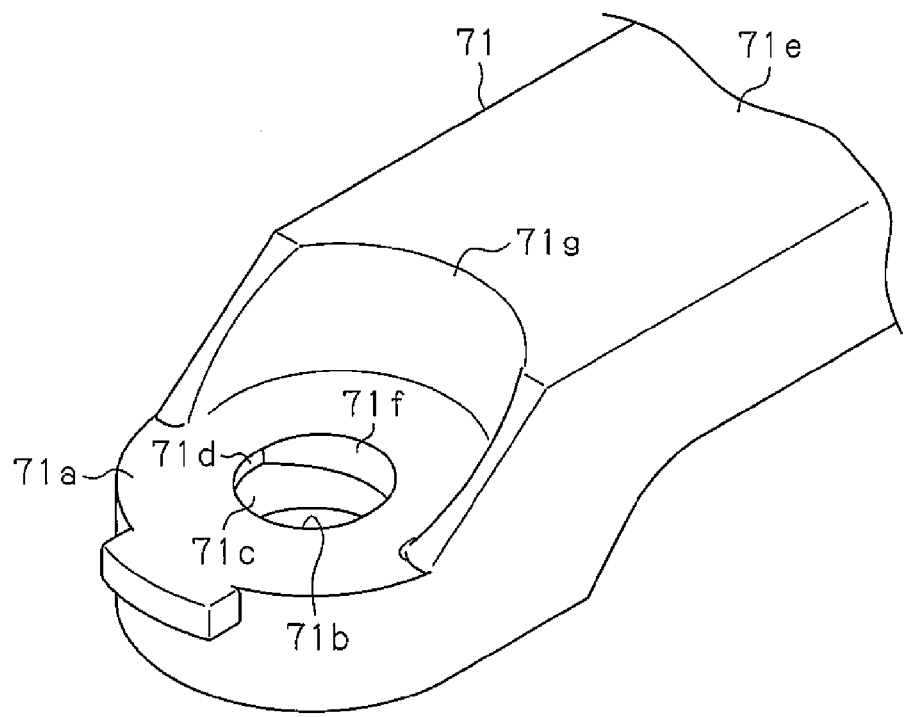
FIG. 16 is a perspective view of the head member of FIG. 15.

For example, FIG. 14 shows a modified example. In this example, the tube 21d of the above embodiment is not formed on a shaft fixing portion 61. Additionally, to obtain the axial length of the through hole 21a, a protrusion 61a protrudes downward from the lower surface of the shaft fixing portion 61 around the through hole 21a. Additionally, in this example, a recess 63 is formed in the lower surface of a head extension 62 to accommodate the second arm portions 22c. This also obtains the same advantages as those of the above embodiment.

In the above embodiment, the head member 21 includes the opposite engagement part 21h at a side of the through hole 21a in a direction opposite to the direction in which the head extension 21c extends. The opposite engagement part 21h is capable of engaging the arm member 22 (slot 22d) in the axial direction. Instead, the opposite engagement part 21h may be omitted from the structure. Alternatively, the opposite engagement part 21h may be changed in shape as long as the opposite engagement part is located at the side of the through hole in a direction opposite to the direction in which the head extension 21c extends and able to engage the arm member 22 in the axial direction. For example, an opposite engagement part may be arranged in the sheath 22a of the arm member 22 and be capable of engaging the sheath 22a in the axial direction. In this case, there is no need to form the slot 22d.

In the above embodiment, the head extension 21c has the form of a tetragonal rod. Instead, for example, the head extension 21c may have a different form such as the form of a U-shaped cross-section that opens upward.

In the above embodiment, each side surface of the head extension 21c, which is opposed to the sheath 22a of the arm member 22, includes the two side surface projections 21f arranged in the extension direction. Instead, the side surface projections 21f may be omitted from the head extension.

In the above embodiment, the upper surface projections 21g are formed on the four corners of the upper surface of the head extension 21c, which is opposed to the sheath 22a of the arm member 22. Instead, the upper surface projections 21g may be omitted from the head extension.

In the above embodiment, the second arm portions 22c are formed by opposite sides of the sheath 22a. Instead, for example, the structure may be formed by only one side.

In the above embodiment, the through hole 21a of the head member 21 is defined by the decreasing diameter portion 21e, the diameter of which decreases at upper locations where the lower end becomes farther, and a hole upper portion, which has a constant diameter and extends from the decreasing diameter portion 21e to the upper end. However, the shape of the through hole 21a may be changed.

For example, FIGS. 15 to 18 show a modified example. In the example, a shaft fixing portion 71a of a head member 71 includes a through hole 71b. The through hole 71b includes a decreasing diameter portion 71c, the diameter of which decreases at upper locations where the lower end becomes farther, and a hole upper portion 71d, which extends from the decreasing diameter portion 71c to the upper end. The hole upper portion 71d includes a hole enlargement portion 71f. The hole enlargement portion 71f allows the wiper fixing shaft 6c to be inserted through the through hole 71b in a state in which the wiper fixing shaft 6c is inclined relative to an extension axis Z (refer to FIG. 17) of the through hole 71b so that the distal end of the wiper fixing shaft 6c is oriented in the direction in which the head extension 71e extends.

Figure 17:
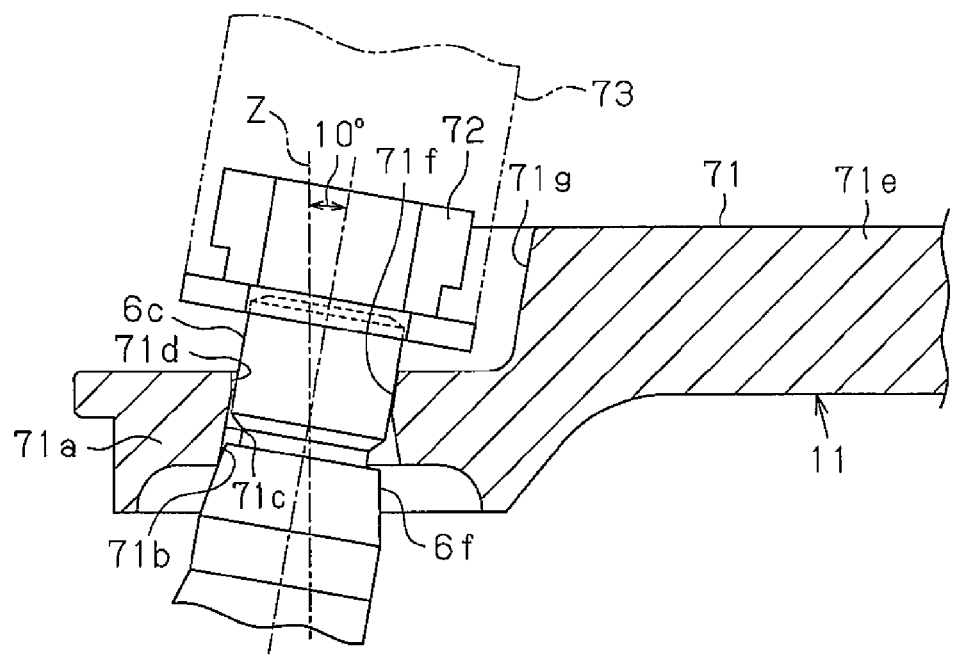
FIG. 17 is a cross-sectional view illustrating a process for coupling the head member of FIG. 15.
Figure 18:
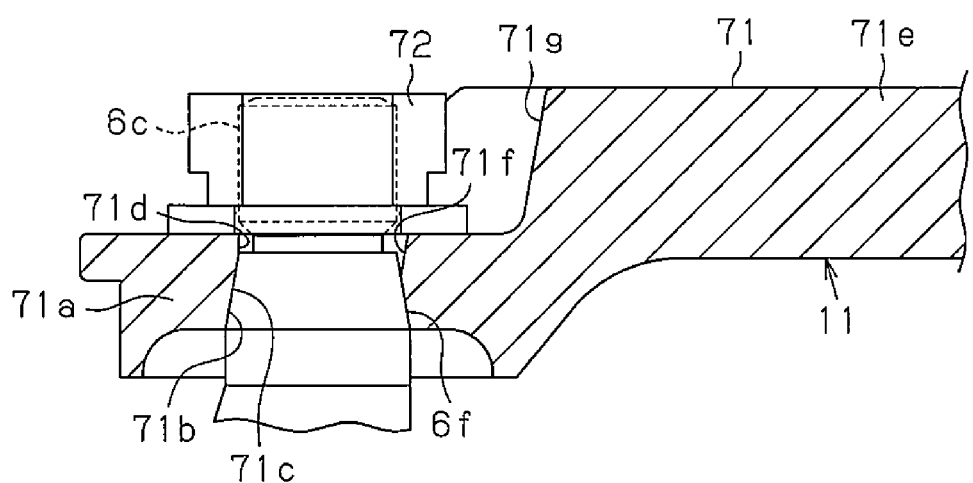
FIG. 18 is a cross-sectional view illustrating the head member of FIG. 15 when coupled.

More specifically, as shown in FIG. 17, the wiper fixing shaft 6c is coupled to the vehicle when the wiper arm 11 (head member 71) is not fixed. In this case, the wiper fixing shaft 6c is inclined due to an urging force (by the compression spring 7) for urging the wiper arm 11. Additionally, the distal side (blade rubber) of the wiper arm 11 (head member 71) contacts the wiped surface. Thus, this may hinder the insertion of the wiper fixing shaft 6c through the through hole 71b with the extension axis Z of the through hole 71b in alignment with the inclination of the wiper fixing shaft 6c. In this regard, in the example, the hole upper portion 71d of the through hole 71b includes the hole enlargement portion 71f allowing the insertion of the wiper fixing shaft 6c, which is inclined by 10° relative to the extension axis Z of the through hole 71b toward the location where the distal portion of the head extension 71e extends. The hole enlargement portion 71f has a shape obtained by partially removing a wall defining a hole having a constant diameter in the axial direction so that the wall surface is inclined by an amount that allows for the insertion of the distal portion of the wiper fixing shaft 6c, which is inclined as shown in FIG. 17.

In the same manner as the above embodiment, the head extension 71e has the form of a tetragonal rod extending from a portion (range of approximately 180°) of the circumference of the shaft fixing portion 71a in the direction orthogonal to the axis and having a thickness increased upward. The portion of the head extension 71e having the increased thickness includes an inner wall located toward the shaft fixing portion 71a. The inner wall is inclined in the same manner as the hole enlargement portion 71f and defines an inclined surface 71g. This limits the striking of a tool 73 used when fastening a nut 72 and allows one to visually confirm and easily use the inclined tool 73. This improves the working efficiency.

In the example, the hole enlargement portion 71f facilitates the coupling of the wiper arm 11 (head member 71) to the wiper fixing shaft 6c. More specifically, when there is no hole enlargement portion 71f, the wiper fixing shaft 6c would need to be lifted against the urging force and inserted into the through hole. Such coupling is difficult. In this example, an inclined wiper fixing shaft 6c may be inserted through the through hole 71b. Thus, the coupling is easy. Additionally, after the inclined wiper fixing shaft 6c is inserted into the through hole 71b, as shown in FIG. 17, the nut 72 is fastened to the wiper fixing shaft 6c when a blade rubber (not shown) arranged on the distal side of the wiper arm 11 is in contact with the wiped surface. In this case, the wiper fixing shaft 6c is lifted so that the inclination of the wiper fixing shaft 6c is canceled relative to the extension axis Z, and the blade rubber is pressed against the wiped surface (refer to FIG. 18). Additionally, in this case, the decreasing diameter portion 6f (knurled portion) of the wiper fixing shaft 6c is pressed against the decreasing diameter portion 71c of the through hole 71b, which limits the rotation relative to each other. More specifically, the decreasing diameter portion 71c of the through hole 71b is formed to be coaxial to the extension axis Z. Thus, when the nut 72 is fastened to the wiper fixing shaft 6c, the decreasing diameter portion 6f (knurled portion) and the entire wall of the decreasing diameter portion 71c are pressed against each other. This restricts rotation relative to each other.

Technical concepts that can be acknowledged from the above embodiments together with the advantages are as follows.

(A) The restriction portion is a pin arranged in the spring cover at a location corresponding to the distal portion of the rod. The distal portion of the rod includes the slit, through which the pin extends. The extension of the pin through the slit allows the distal portion of the rod to move in the drawing direction and restricts free pivoting of the rod.

This structure, in which a restriction portion is a pin arranged in a location of a spring cover that corresponds to a distal portion of a rod, is simpler than when the spring cover and the restriction portion are arranged separately.

(B) The second arm portions are formed from two opposite sides of the sheath.

This structure, in which second arm portions are formed from the two opposite sides of a sheath, allows an arm to be fixed to a head member more firmly than, for example, a structure formed only by one side.

The invention claimed is:

1. A vehicle wiper device comprising:
a wiper arm;
a drive source;
a drive shaft that is pivoted back and forth by the drive source and has a pivot axis; and
a wiper arm urging member that includes
a swing member arranged to be pivotal integrally with the drive shaft,
an inclination member supported by the swing member and inclinable about an inclination axis, wherein the inclination axis and the pivot axis have an intersecting or skew positional relationship, and the inclination member includes a wiper fixing portion, to which the wiper arm is fixed, and a drawing portion that extends toward a distal side of the wiper arm relative to the inclination axis,
a rod including a basal end supported by the drawing portion pivotally about a parallel axis, wherein the parallel axis is parallel to the inclination axis, and
a compression spring including a first end and a second end located at a side opposite to the first end, wherein the first end is supported by the swing member and the second end applies an urging force to a distal end of the rod so that the compression spring acts to draw the drawing portion and urge a distal end of the wiper arm toward a wiped surface.

2. The vehicle wiper device according to claim 1, wherein the swing member includes a restriction portion,
the restriction portion allows a distal portion of the rod to move in a drawing direction, and
the restriction portion restricts free pivoting of the rod.

3. The vehicle wiper device according to claim 1, wherein the swing member includes a spring cover, and
the spring cover covers a side of the compression spring oriented toward the distal end of the wiper arm.

4. The vehicle wiper device according to claim 3, wherein the spring cover is formed integrally with the swing member.

5. The vehicle wiper device according to claim 1, wherein the compression spring is arranged so that a compression direction is parallel to the drive shaft.

6. The vehicle wiper device according to claim 1, wherein a swing lever that receives a drive force from the drive source is fixed to the drive shaft, and
the swing member is fixed to the swing lever.

7. The vehicle wiper device according to claim 6, wherein the swing member includes two fixing portions, and
the two fixing portions are fixed to the swing lever so that the drive shaft is located between the two fixing portions as viewed in an axial direction of the drive shaft.

8. The vehicle wiper device according to claim 7, wherein the wiper fixing portion includes a wiper fixing shaft arranged coaxially to the drive shaft, and
the two fixing portions are arranged separately from each other so that the swing member is not located between the drive shaft and the wiper fixing shaft.

9. The vehicle wiper device according to claim 1, further comprising:
a cover attached to at least one of the inclination member and the swing member, wherein
the cover covers at least an upper portion of where the swing member and the inclination member are connected, and
the cover allows the inclination member to incline.

10. The vehicle wiper device according to claim 9, wherein the wiper fixing portion includes a wiper fixing shaft,
the cover includes a resin cover main body and an elastic cover portion,
the cover main body is fixed to a pivotal member, which is capable of pivoting integrally with the drive shaft, or a stationary member, which is incapable of pivoting integrally with the drive shaft,
the elastic cover is fixed to the cover main body,
the wiper fixing shaft extends through the elastic cover, and
the elastic cover allows the inclination member to incline while closely contacting a periphery of the wiper fixing shaft.

11. The vehicle wiper device according to claim 9, wherein the cover is arranged to be pivotal integrally with the swing member, and
the cover includes an annular wall, which extends upward from an upper surface of the cover, and a tubular drain, which extends downward at an inner side of the wall.

12. The vehicle wiper device according to claim 11, wherein the drain is arranged in the cover at a side of the drive shaft opposite to the distal end of the wiper arm.

13. The vehicle wiper device according to claim 1, wherein the wiper fixing portion includes a wiper fixing shaft;
the wiper arm includes a head member and an arm formed by a plate material;
the head member includes
a shaft fixing portion fixed to the wiper fixing shaft, wherein the shaft fixing portion includes a through hole, through which the wiper fixing shaft is inserted, and
a head extension that extends from the shaft fixing portion in a direction orthogonal to a direction in which the pivot axis extends; and
the arm includes
a sheath that covers an upper surface and a side surface of the head member,
a first arm portion that further extends from the sheath in a direction in which the head extension extends, and
a second arm portion that extends from the sheath and holds a lower surface of the head extension.

14. The vehicle wiper device according to claim 13, wherein
the head member further includes an opposite engagement part capable of engaging the arm in the direction in which the pivot axis extends, and
the opposite engagement part is located at a portion of the head member opposite to the direction in which the head extension extends.

15. The vehicle wiper device according to claim 13, wherein
the through hole includes a hole enlargement portion, and
the hole enlargement portion allows the wiper fixing shaft to be inserted through the through hole in a state in which the wiper fixing shaft is inclined relative to an extension axis of the through hole so that a distal end of the wiper fixing shaft is oriented in a direction in which the head extension extends.

* * * * *